United States Patent [19]

Maruno et al.

[11] Patent Number: 5,844,647
[45] Date of Patent: Dec. 1, 1998

[54] LIQUID CRYSTAL DISPLAY DEVICE

[75] Inventors: Motoshi Maruno, Kawasaki; Hajime Sato; Hirohisa Tanaka, both of Yokohama, all of Japan

[73] Assignee: Kabushiki Kaisha Toshiba, Kawasaki, Japan

[21] Appl. No.: 796,522

[22] Filed: Feb. 7, 1997

[30] Foreign Application Priority Data

Feb. 9, 1996 [JP] Japan ................................. 8-024167

[51] Int. Cl.⁶ .......................... G02F 1/1333; G02F 1/136
[52] U.S. Cl. .............................. 349/110; 349/138; 349/43
[58] Field of Search .............................. 349/110, 43, 138; 257/59, 72

[56] References Cited

U.S. PATENT DOCUMENTS 5,567,967  10/1996  Kusumoto ............................... 257/353
5,686,980  11/1997  Hirayama et al. ...................... 349/110

FOREIGN PATENT DOCUMENTS 56-7480   1/1981   Japan .
2-12031   1/1990   Japan .
7-176748  7/1995   Japan .

*Primary Examiner*—William L. Sikes
*Assistant Examiner*—Tiep H. Nguyen
*Attorney, Agent, or Firm*—Pillsbury Madison & Sutro LLP

[57] ABSTRACT

In the liquid crystal display element, the light incident upon the poly-crystal silicon serving as an active layer for forming a poly-crystal silicon thin film transistors can be shaded, and further the light leaking through the gaps between the lines and the pixel electrodes can be shaded, so that it is possible to prevent the display performance from being lowered at relatively low cost, without reducing the aperture ratio of the display device. The liquid crystal display device having a transparent insulating substrate (18); pixel electrodes (8) arranged on the insulating substrate in matrix pattern to drive liquid crystal; and poly-crystal silicon thin film transistors (6) each formed on an active layer (21) arranged in correspondence to each pixel electrode (8) to apply voltage to each pixel electrode (8) is characterized in that an amorphous silicon film (19) is formed under the active layer (21) via an insulating film (20) to shade light incident upon the active layer (21) and light leaking through the gaps between the lines (1 and 2) and the pixel electrodes (8).

10 Claims, 9 Drawing Sheets

LIQUID CRYSTAL DISPLAY DEVICE

BACKGROUND OF THE INVENTION

1. Field of the Invention

The present invention relates to a liquid crystal display device, and more specifically to a liquid crystal display device of array substrate structure such that polycrystal silicon thin film transistors are arranged.

2. Description of the Prior Art

In the following description, optical density is defined as follows:

$OD_1$: a value expressed by a logarithm of reciprocal of transmissivity of each light wavelength to the base ten $OD_2$: a value obtained by replacing transmissivity as expressed by $OD_1$ with an average value of transmissivity in visible ray region $OD_3$: a value obtained by replacing transmissivity as expressed by $OD_1$ with an average value of transmissivity multiplied by a relative visibility weight in visible ray region Therefore, the $OD_1$ to $OD_3$ can be expressed as $$OD_1 = -\log_{10} T(\lambda)$$
$$OD_2 = -\log_{10} \tilde{T}(\lambda)$$
$$OD_3 = -\log_{10} Y(\lambda)$$
$$\tilde{T}(\lambda) = \frac{\int_a^b T(\lambda) d\lambda}{b-a}$$
$$Y(\lambda) = \frac{\int_a^b T(\lambda) V(\lambda) d\lambda}{b-a}$$

where $\lambda$ denotes light wavelength; $T(\lambda)$ denotes transmissivity of each wavelength; a and b denote both ends of visible rays as a=400 nm and b=700 nm; and $V(\lambda)$ denotes a standard relative visibility.

Recently, there is a great demand for the liquid crystal display device as a picture display unit having thin thickness, lower power consumption, and high picture quality.

FIG. 14 is a simplified illustration showing a general liquid crystal display device, in which an active matrix type is shown in particular. In FIG. 14, scanning lines 1 and signal lines 2 are arranged on an array substrate in matrix pattern, and a thin film transistor 6 is arranged for each intersection between both the lines 1 and 2. A gate electrode 3 of the thin film transistor 6 is connected to the scanning line 1, and a source electrode 4 of the same transistor 6 is connected to the signal line 2. On the other hand, a drain electrode 5 of the thin film transistor 6 is connected to an auxiliary capacitance 7 and a pixel electrode 8. Here, the pixel electrode 8 is a transparent electrode for driving the liquid crystal (not shown).

Further, the scanning lines 1 are selectively driven by a Y driver, and the signal lines 2 are selectively driven by an X driver.

In the above-mentioned construction, when a voltage is applied to the gate electrode 3 of the thin film transistor 6 connected to the scanning line 1 and further another voltage is applied to the source electrode 4 of the same thin film transistor 6 connected to the signal line 2, since current flows between the source electrode 4 and the drain electrode 5 of the thin film transistor 6, the potential of the auxiliary capacitance 7 and the pixel electrode 8 becomes equal to the signal potential, so that the potential of the signal line 2 can be applied to the liquid crystal. As a result, a desired display can be obtained at the pixel corresponding to the activated liquid crystal on the matrix.

Now, recently, as the thin film transistor for driving the liquid crystal, the transistor whose active layer is formed of poly-crystalline silicon has been noticed. This is because the poly-crystalline silicon thin film transistor has a high mobility and further the driving circuit can be formed on the same substrate, which are both suitable for the liquid crystal display device.

On the other hand, FIG. 15 is a cross-sectional view showing the general liquid crystal display device. In FIG. 15, the liquid crystal 13 is injected and arranged between an array substrate 12 and an opposed substrate 11. Further, an opposed electrode 10 is arranged on the surface of the opposed substrate 11 so as to be opposed to the liquid crystal 13. Further, the opposed electrode 10 is laminated together with a color filter 9 on the opposed substrate 11. Further, an light-incident side polarizing plate 14 and an light-output side polarizing plate 15 are arranged so as to sandwich the cell constructed as described above. Further, a back light 16 is disposed on the outside of the light-incident side polarizing plate 14.

FIG. 16 is a cross-sectional view showing another example of the general liquid crystal display device. The construction shown in FIG. 16 is basically the same as with the device shown in FIG. 15, except that the array substrate 12 on which the thin film transistors 6 are formed is arranged on the light-output side and the opposed substrate 11 is arranged on the light-incident side.

In the liquid crystal display device constructed as described above, light emitted from the back-light 16 is introduced into the cell through the light-incident side polarizing plate 14; light is modulated by the liquid crystal 13 driven by the thin film transistors 6 according to the display pattern; and the modulated light is emitted through the light-output side polarizing plate 15.

By the way, in the liquid crystal display element using amorphous silicon thin film transistors or poly-crystalline silicon thin film transistors, since light leaks through gaps formed between the lines and the pixel electrodes at the area other than the pixel display regions on the array substrate 12, there exists a problem in that black cannot be displayed clearly and thereby the display performance deteriorates.

As means for overcoming these problems, there have been so far known such a method of arranging an acrylic resin mixed with metal (e.g., chromium oxide) or carbon on the opposed substrate 11 as a light shading film or a method of arranging an acrylic resin mixed with red, blue and green pigments or an application-type photosensitive resist on the side of the array substrate 12.

On the other hand, in the case where the thin film transistors 6 of top gate type are used, since the light incident from the side of the array substrate 12 is incident upon the active layer thereof, even when the thin film transistor 6 serving as the pixel transistor is turned off, light-leak current inevitably flows between the source electrode 4 and the drain electrode 5 thereof, so that the potential of the liquid crystal capacitance changes, thus causing a problem in that the display performance deteriorates.

To solve this problem, there exists a method of arranging a light shading film under the active layer on the array substrate 12. In this case, as the light shading film, it is preferable to use a film having a high conductive resistance and a high temperature resistance against the temperature required to form the thin film transistor 6 discloses an example of this film, in which an amorphous silicon film is formed under the active layer of the amorphous silicon thin film transistor.

However, the conventional liquid crystal display device constructed as described above encounter the following problems:

In the case where the light shading film is formed on the opposed substrate 11, since it is necessary to broaden the area of the light shading film to such an extent as to be brought into contact with the display region, in order to prevent the mismatch in position between the light shading film and the array substrate 12, a problem arises in that the aperture ratio thereof is reduced.

Further, in the case where the back light 16 is arranged on the side of the array substrate 12 and the display is seen from the side of the opposed substrate 11 (i.e., the structure as shown in FIG. 15), when a metal light shading film such as chromium oxide is formed on the opposed substrate 11, a problem arises in that light is reflected from the metal so that the display performance deteriorates.

In contrast with this, in the case where the back light 16 is arranged on the side of the opposed substrate 11 and the display is seen from the side of the array substrate 12 (i.e., the structure as shown in FIG. 16), when the gate electrode 3 of the thin film transistor 6 formed on the array substrate 12 is formed of metal, a similar problem arises in that the display performance deteriorates due to the light reflection.

On the other hand, in the case where a light shading film is formed on the array substrate 12, since a conductive material cannot be used as the light shading material, only the acrylic resin mixed with red, blue and green pigments has been so far used. However, in order to prevent the light leakage through the gaps between the lines and the pixel electrodes, since an optical density $OD_3$ of two or more is required as the minimum value, it has been necessary to increase the film thickness as thick as 1.5 to 2.0 $\mu$m.

Further, in order to prevent light leakage through the amorphous silicon thin film transistors, when an amorphous silicon film is used as the underlying light shading film, it has been confirmed by the inventors on the basis of various experiments that 1 $\mu$m or more thickness is required for the light shading film. Therefore, when another film (e.g., the gate insulating film or the gate electrode 3) is formed upon this amorphous silicon film, there exists a problem in that the coverage of the amorphous silicon film by this other film deteriorates. To overcome this problem, the thickness of the amorphous silicon film must be reduced preferably less than 1000 angstroms. In this case, since a film other than the light leakage preventing film must be formed additionally, there exists another problem in that the number of manufacturing steps increases.

SUMMARY OF THE INVENTION

With these problems in mind, therefore, it is the object of the present invention to provide a liquid crystal display device, which can shade light incident upon the active layer of poly-crystal silicon and further light leaking through the gaps between the lines and the pixel electrodes, without reducing the aperture ratio thereof and without increasing the manufacturing cost.

To achieve the above-mentioned object, the present invention provides a liquid crystal display device, comprising: a first electrode substrate having: a transparent insulating substrate; scanning lines and signal lines arranged crossing each other on said transparent insulating substrate in a matrix pattern; a plurality of pixel electrodes formed at positions enclosed by said scanning lines and said signal lines, respectively; and a plurality of poly-crystal silicon thin film transistors formed on said transparent insulating substrate via a light shading film of amorphous semiconductor and an insulating film, said light shading film serving to prevent light from being incident upon an active layer of said transistors, a source electrode of each transistor being connected to said signal line and a drain electrode of each transistor being connected to said pixel electrode; a second electrode substrate having an opposing electrode; and a liquid crystal encapsulated between said first and second electrode substrates.

DETAILED DESCRIPTION OF THE PREFERRED EMBODIMENTS

Figure 1:
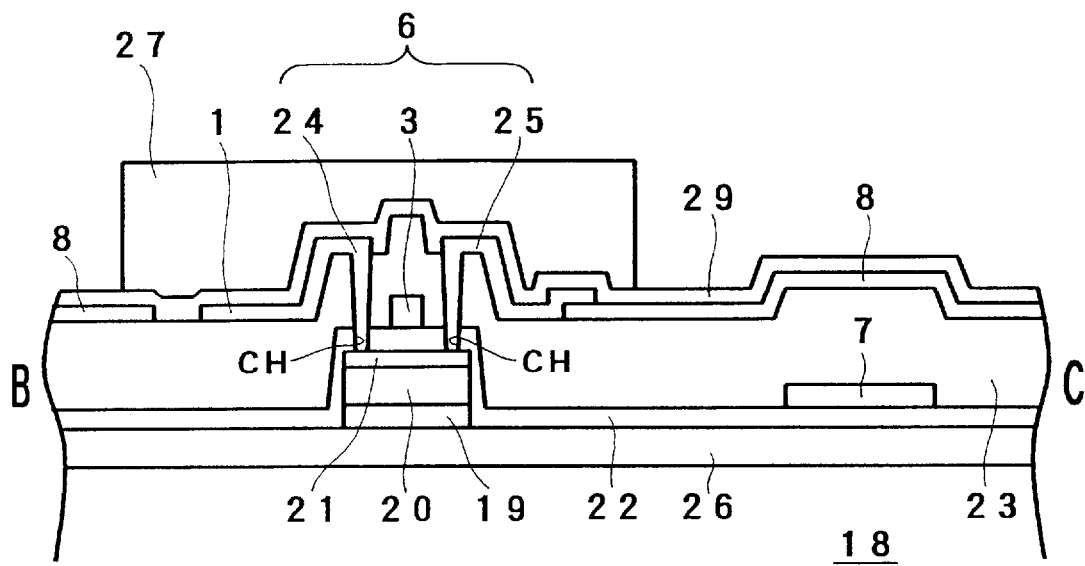
FIG. 1 is a cross-sectional view showing a pixel of a first embodiment of the liquid crystal display device according to the present invention, taken along two lines B–C in FIG. 9.

One of the features of the liquid crystal display device according to the present invention is to form an amorphous semiconductor film and an insulating film on the array substrate 12 but under the active layer of the top gate type poly-crystalline silicon thin film transistor. The insulating film is formed to insulate the thin film transistor from the amorphous semiconductor film or vice versa. This amorphous semiconductor has such advantages as not only to be formed simply as compared with black matrix material as described under Description of the Prior Art but also to be resistant against the process temperature of about 600° C. In addition, since the conductivity of the amorphous semiconductor is less than $10^{-6}$ $(\Omega cm)^{-1}$, even if used as an array substrate, this level causes no problem.

As practical examples of the amorphous semiconductor film usable as a light shading film, there are a silicon film formed by use of oxygen gas or nitrogen gas and in accordance with reactive spattering method, a germanium cermet (GeSiNO) film, amorphous silicon film, etc. These amorphous semiconductors have a large absorption coefficient to visible light, as compared with that of the polycrystalline silicon or mono-crystalline silicon. The experiments conducted by the Inventors indicate that in the case of the transistor having an active layer formed of poly-crystalline silicon, it is possible to form a light shading film (whose optical density $OD_2$ must be more than one) under the active layer of the transistor, in order to suppress the light leak current down to a level not to deteriorate the display performance. Here, in the case of the liquid crystal display device having a display screen of about 200 nit brightness, the film thickness required to suppress the photo-leakage current of the poly-crystalline silicon thin film transistor down to a level low enough not to deteriorate the display performance; in other words, the film thickness for realizing an optical density $OD_2$ of one or more is approximately 5000 angstrom in the silicon film formed by reactive spattering method, 5000 angstrom in the germanium cermet, and 1000 angstrom in the amorphous silicon, respectively. In particular, when this light shading film is formed in the same pattern as that of the active layer, since the active layer, the insulating film and the amorphous semiconductor film can be all etched simultaneously, it is possible to form these films without increasing the number of manufacturing steps. In particular, when the dehydration processing is made, the absorption coefficient to visible light of the dehydrated amorphous silicon is further increased. Further, the optical density $OD_3$ of the amorphous silicon film having a film thickness of about 4000 angstrom is two or more. Further, according to the Japanese Published Examined (Koho) Patent Application No. 2-12031, the absorption coefficient of amorphous silicon doped by argon is large. The disclosed data indicate that the optical density $OD_3$ of this amorphous silicon having a film thickness of 2500 angstrom is two or more in the visible light range. Therefore, when an optical density $OD_3$ of two or more can be realized, it is possible to use the amorphous silicon not only as a light shading film for suppressing the photoleakage current but also as a film for preventing light from leaking through the gaps between the lines and the pixel electrodes.

Here, however, since the transmissivity of the amorphous silicon film is large on the side of red wavelength, there exists a possibility that the screen is seen somewhat in red. In this case, it is possible to prevent light leak by further forming a blue filter at the portion other than the pixel display regions. Recently, a technique of forming a color filter on the array substrate has been developed. Therefore, when the blue filter is formed simultaneously together with the color filter formed at the pixel display regions, it is unnecessary to increase the number of the manufacturing steps for forming the blue filter.

As described above, in the liquid crystal display device using the poly-crystalline silicon thin film transistors, when an insulating film and an amorphous silicon film are formed on the array substrate but under the active layer, it is possible to solve the problem such that the display performance deteriorates, by shading both the light leaking through the gaps in the portions other than the pixel display regions and the light incident upon the active layer from the array substrate side (which causes a leak current of the thin film transistors).

Further, as the countermeasures against the light leakage through the array substrate, that is, in order to realize a high aperture ratio, there has been developed such a liquid crystal display device that transparent pixel electrodes are formed on the upper layer of the matrix lines so as to be overlapped upon the matrix wiring in order to prevent light from leaking through the gaps among the thin film transistors, the matrix wiring and the pixel electrodes. In this liquid crystal display device, although it is unnecessary to form an additional film for preventing light leakage, it is necessary to form a light shading film having an optical density $OD_2$ of one or more of to prevent the light leak current. In this case, when the insulating film and the amorphous semiconductor film can be both formed by use of the same pattern, it is possible to prevent the photo-leakage current, without increasing the number of the manufacturing steps.

As described above, in the liquid crystal display device according to the present invention, it is possible to form a practical light shading film on the array substrate, while solving the problems related to the film thickness and the number of manufacturing steps. Further, when the back light is incident upon the pixel display regions from the array substrate side and the pixel display regions are seen from the opposed substrate side, it is possible to solve the problem related to the light reflected from metal.

In summary, in the liquid crystal display device according to the present invention, since the insulating film and the amorphous silicon film are both formed under the active layer on the array substrate, it is possible to shade the light leaking through the gaps at the portion other than the pixel display regions and the light incident upon the active layer to generate the leak current of the thin film transistors, so that the deterioration of the display performance can be prevented securely.

In the liquid crystal display device using poly-crystal silicon thin film transistors according to the present invention, as already explained, the object is to prevent the display performance from being lowered by the light leak current caused by the light incident upon the active layer from the array substrate side and the light leaking through the gaps at the portions other than the pixel display regions.

Figure 11:
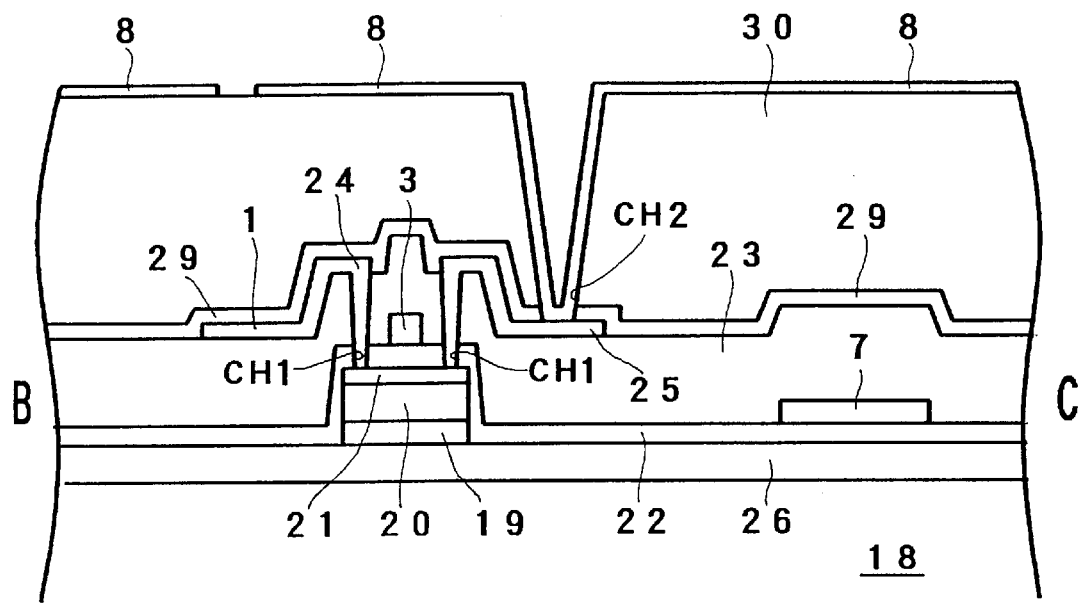
FIG. 11 is a cross-sectional view showing a pixel of the fifth embodiment of the liquid crystal display device, taken along the two lines B–C shown in FIG. 12.

To achieve the above-mentioned object, in the present invention, an amorphous semiconductor film is formed under the active layer of the poly-crystalline silicon thin film transistor formed on the array substrate via an insulating film, to shade the light incident upon the poly-crystalline silicon of the active layer (as shown in FIGS. 1 and 11). Further, in the present invention, an insulating film and an amorphous film are formed under the active layer film of the poly-crystal silicon thin film transistor formed on the array substrate and at the portion other than the pixel display regions, to shade both the light incident upon the poly-crystal silicon of the active layer and the light leaking through the gaps (as shown in FIGS. 3 to 8).

Embodiments of the present invention will be described hereinbelow with reference to the attached drawings.

First embodiment

Here, it is possible to obtain an optical density $OD_2$ of one or more in the following respective films, that is, the amorphous silicon film having a film thickness of 1000 angstrom, the silicon film having a film thickness of 5000 angstrom and formed by the reactive spattering method using oxygen or nitrogen gas, and the germanium cermet (GeSiNO) film having a film thickness of 5000 angstrom. In the above-mentioned film thickness, the optical density $OD_3$ is two or less, so that it is impossible to shade the light leaking through the gaps at the pixel display regions. However, it is possible to use these light shading films as the films for suppressing the leak current of the thin film transistors.

Figure 2:
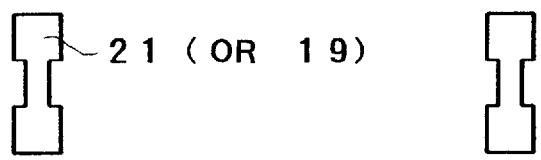
FIG. 2 is a plane pattern view showing the active layer or the light shading film used for the first and fifth embodiments.
Figure 2:

On the basis of this fact, in the first embodiment, the amorphous semiconductor is formed under the active layer of the poly-crystalline silicon thin film transistor via the insulating film, to prevent photo-leakage current which causes a reduction of the pixel display performance. The pixel range of the first embodiment will be described in more detail hereinbelow with reference to FIGS. 1 and 2. FIG. 1 is a cross-sectional view taken along the lines B–C in FIG. 9; and FIG. 2 is a plane view showing the pattern of the light shading film. Further, the pixel thin film transistor is of n-type poly-crystalline silicon type, and only the pixel display region is shown and explained hereinbelow.

On a glass substrate 18 formed with an undercoat film 26, an amorphous semiconductor film 19 as a light shading film, an insulating film 20, and an amorphous silicon film as an active layer 21 are formed continuously in a vacuum in accordance with PE-CVD (plasma chemical vapor deposition) method.

After that, the substrate is heat-treated at 500° C. to dehydrate hydrogen existing in the amorphous semiconductor film 19, the insulating film 20 and the active layer 21. Here, the film thickness of the amorphous semiconductor film 19 is 1000 angstrom; the film thickness of the insulating film (silicon nitride film) is 1000 angstrom; and the film thickness of the active layer (amorphous silicon film) is 500 angstrom.

Further, the amorphous silicon film of the active layer 21 is poly-crystallized by ELA (excimer laser anneal) method. Here, the irradiation power of the laser is 150 to 400 mJ/cm². Within this irradiation power, it is possible to poly-crystallize the amorphous silicon film without causing any abrasion and further without exerting any influence upon the amorphous semiconductor film 19 formed under the insulating film 20. (The irradiation laser power is the same in the second to fifth embodiments described later).

Then, the three layers of the poly-crystalline silicon film (active layer) 21, the silicon nitride film (insulating film) 20, and the amorphous semiconductor 19 are processed continuously by CDE (chemical dry etching) method using a mixture gas of $CF_4$ and $O_2$, to obtain an island-shaped pattern as shown in FIG. 2.

Figure 9:
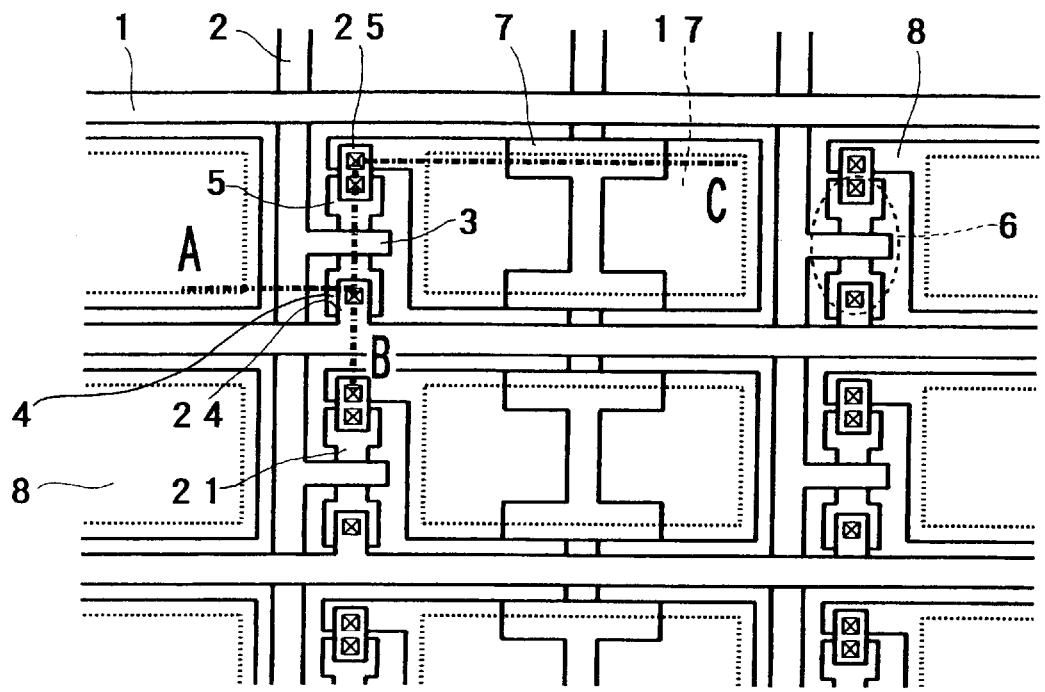
FIG. 9 is a plane view showing the pixels of the first to fourth embodiments.

Further, an oxide film used as a gate insulating film 22 having a thickness of 1000 angstrom is formed by AP (atmospheric pressure and room temperature)-CVD method. After that, a gate electrode 3, an auxiliary capacitance electrode 7, and a MoW (molybdenum tungsten alloy) layer used as the scanning lines 2 as shown in FIG. 9 are formed by spattering, and then processed by CDE (chemical dry etching) method. Further, the film thickness of the MoW layer is 2500 angstrom.

Further, PH3 (donor) is implanted in accordance with ion doping method. The implantation conditions are that acceleration voltage is 70 KeV and the dose is 1E16/cm². Here, since the gate electrode 3 can function as a self-alignment mask for the active layer 21 under the gate electrode 3, impurities are not implanted.

After that, an interlayer insulating film 23 is formed at film forming temperature of 400° C. In this step, impurities are activated, so that the drain regions 4 and the source regions 5 (shown in FIG. 9) of the thin film transistors 9 can be formed. Further, the interlayer insulating film 23 is an oxide film having a film thickness of 5000 angstrom.

Further, after a contact hole CH has been formed, an ITO layer used as pixel electrodes 8 is formed by spattering method, and then patterned by wet etching method. After that, the signal lines 1 of double-layer structure Mo (lower layer) and Al (upper layer), lines 25 each for connecting the active layer shown in FIG. 9 to the pixel electrode 8, and lines 24 each for connecting the thin film transistor to the signal line are formed by spattering, and then patterned by wet etching method. Further, the film thickness of the Mo film is 1500 angstrom and the film thickness of the Al film is 4500 angstrom, respectively.

Further, after an array protective film 29 has been formed by PE-CVD method, a contact hole (not shown) used to connect an external terminal is formed. Further, the protective film is a silicon nitride film, and the film thickness thereof is 2000 angstrom.

Figure 10:
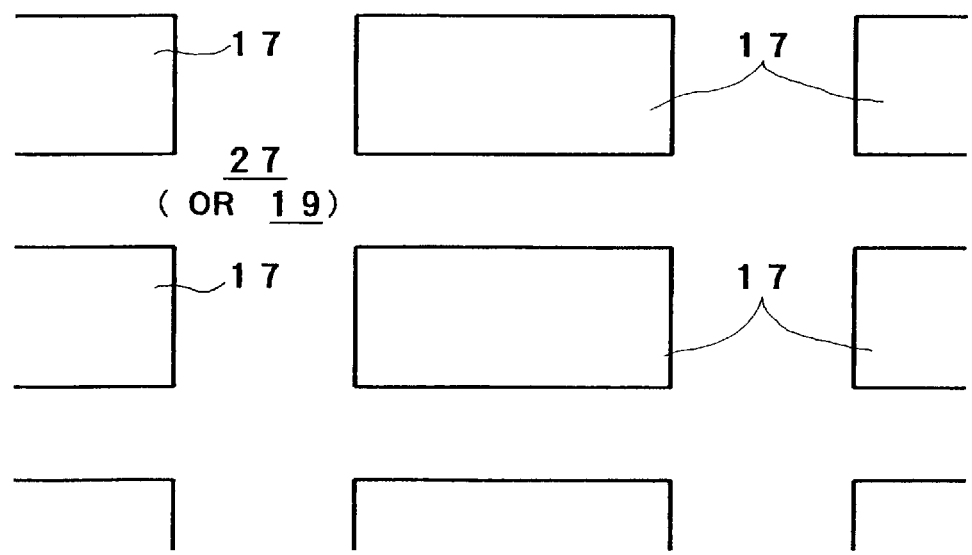
FIG. 10 is a plane view showing a light shading film and the pixel display regions of the first to fourth embodiments.

Finally, in order to shade light leaking through the gaps of the pixel display regions, a light shading film 27 is formed by use of photosensitive organic material having an optical density of two or more. Here, the plane pattern of the light shading film 27 is shown in FIG. 10, in which the pixel display regions 17 are removed. Further, the plane pattern of the light shading film for preventing light from being incident upon the active layer is the same as that of the active layer, as shown in FIG. 2.

The feature of the above-mentioned first embodiment is to form the film for suppressing the photo-leakage current of the thin film transistors and the film for shading the light leaking from the gaps between the pixel display regions independently. Here, since the light leak suppressing film can be formed and processed simultaneously together with the active layer, it is possible to minimize an increase of the manufacturing steps. Further, since the light shading film can be formed at the final step, it is possible to form this film without exerting any restriction to the processing of the thin film transistors. Further, since this light shading film is formed on the array side, the width of the light shading film can be determined by taking into account only the matching precision in the exposure process, without taking account the matching precision with the opposed substrate, so that the aperture ratio can be increased.

Second embodiment

Figure 3:
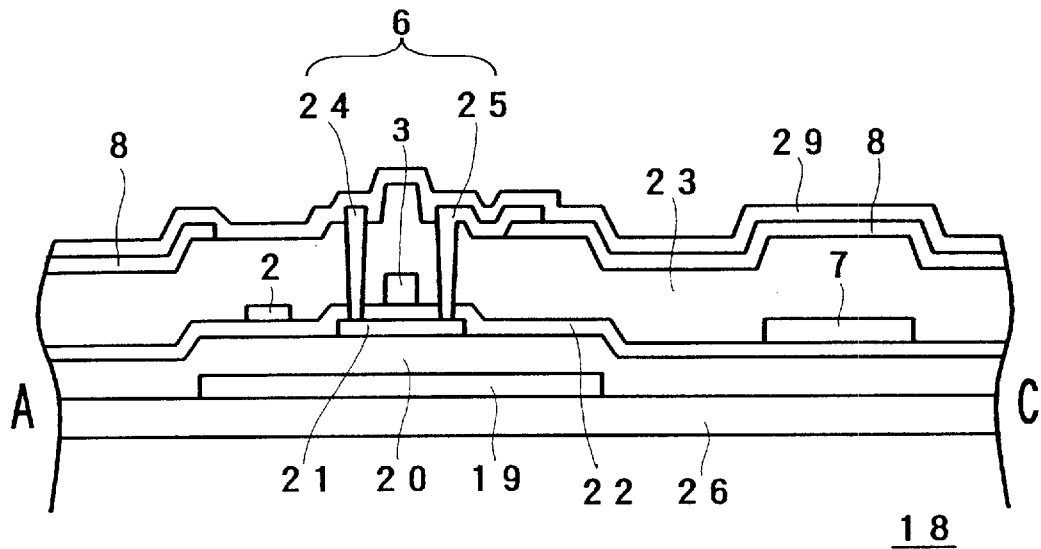
FIG. 3 is a cross-sectional view showing a pixel of a second embodiment of the liquid crystal display device, taken along the two lines A–C shown in FIG. 9.
Figure 4:
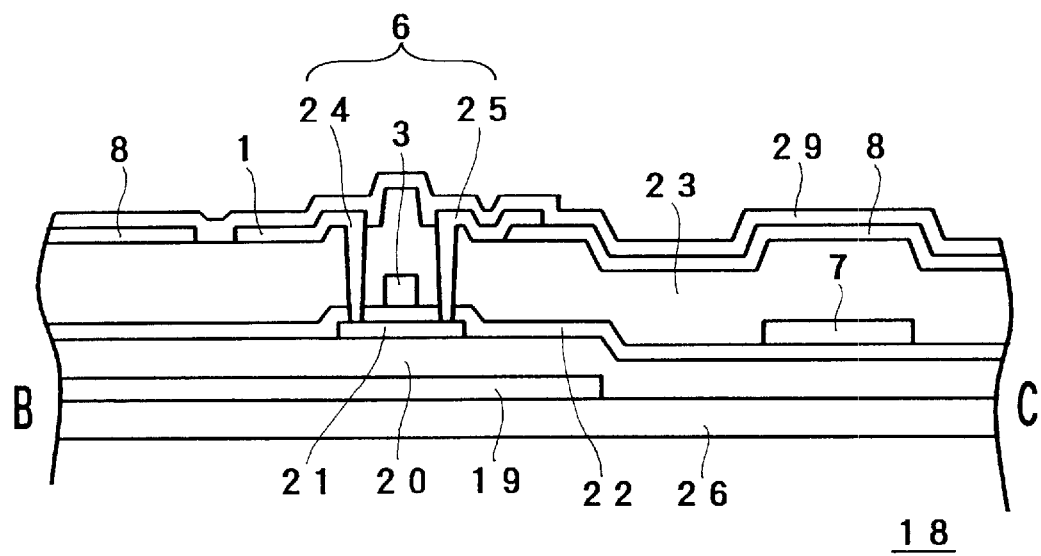
FIG. 4 is a cross-sectional view showing a pixel of the second embodiment of the liquid crystal display device, taken along the two lines B–C shown in FIG. 9.

In this second embodiment, the light incident upon the active layer from the array substrate side (which causes the leak current of the thin film transistor) and the light leaking through the gaps other than the pixel display region can be both prevented. That is, an amorphous semiconductor (amorphous silicon film) having an optical density $OD_3$ of two or more is formed under the poly-crystal silicon thin film transistors. FIG. 3 is a cross-sectional view showing the pixel display region, taken along the lines A–C in FIG. 9; and FIG. 4 is a cross-sectional view showing the same pixel display region, taken along the lines B–C in FIG. 9. The second embodiment will be described hereinbelow with reference to these drawings and FIG. 2 (which shows the plane pattern of the light shading film) and FIG. 10 (which shows the pixel display regions).

Further, the same reference numerals have been retained for similar parts or elements having the same functions as with the case of the first embodiment. Further, the same manufacturing process is omitted herein.

On the glass substrate 18 formed with an undercoat film 26, an amorphous silicon film (an amorphous semiconductor film) 19 is formed by the PE-CVD method. The film thickness thereof is 4000 angstrom, by which an optical density $OD_3$ of two or more can be obtained. Further, the substrate is processed into a shape having the portions other than the pixel display regions 17, as shown in FIG. 10, by the CDE method.

After that, an oxide film 20 for insulating the active layer 21 from the light shading film layer 19 is formed by the AP-CVD method at temperature 400° C. The film thickness thereof is 4000 angstrom.

Further, after the amorphous silicon film (active layer) 21 has been formed by the PE-CVD method, hydrogen existing in the light shading film 19 and the amorphous silicon film 21 is dehydrated by heat treatment at 500° C.

Further, after the amorphous silicon film 21 has been poly-crystallized by the ELA method, the poly-crystalline silicon film is formed into the island-shaped pattern 21 as shown in FIG. 2 by use of the CDE method.

The substrate is processed in the same way as with the case of the first embodiment. Here, however, since the light shading film 19 can prevent the light leakage, the light shading film 27 formed of organic material (of the first embodiment) is not formed on the uppermost layer of the array.

In the structure of this second embodiment, it is possible to form the light shading film on the array, without considering the manufacturing process and installation required for the organic material.

Third embodiment

Figure 5:
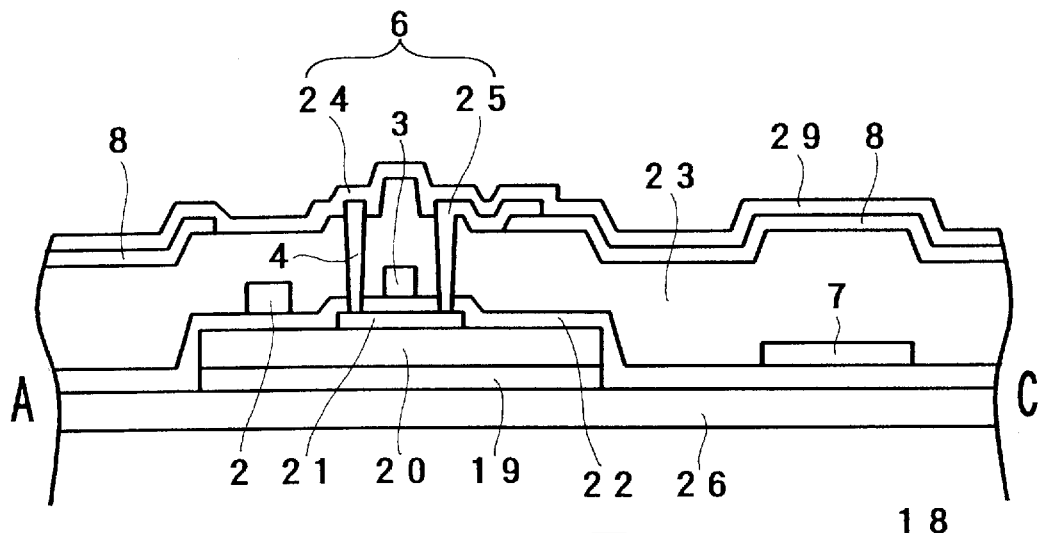
FIG. 5 is a cross-sectional view showing a pixel of a third embodiment of the liquid crystal display device, taken along the two lines A–C shown in FIG. 9.
Figure 6:
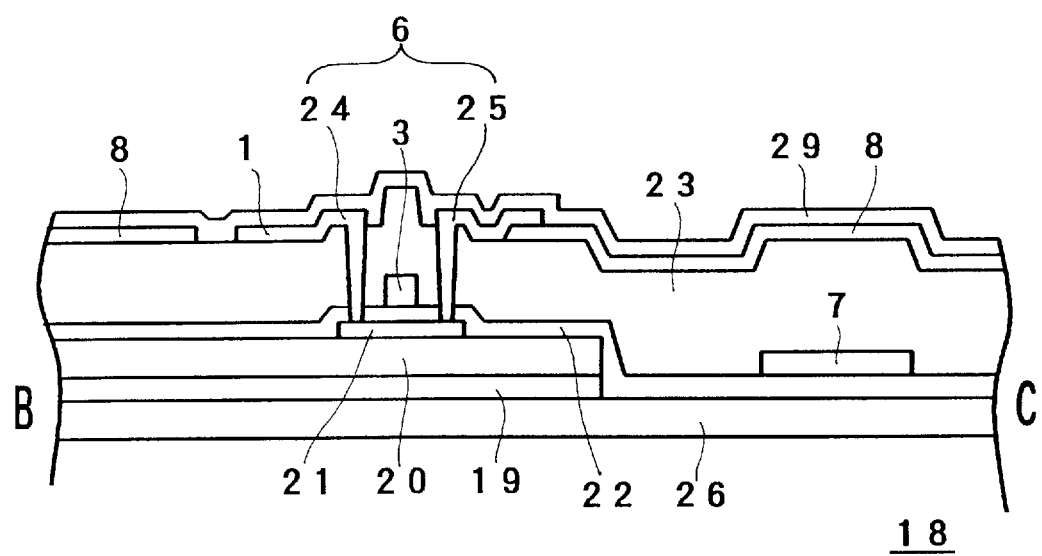
FIG. 6 is a cross-sectional view showing a pixel of the third embodiment of the liquid crystal display device, taken along the two lines B–C shown in FIG. 9.

In this third embodiment, the shape of the insulating film 20 formed between the light shading film 19 and the active layer 21 is different from that of the second embodiment. FIG. 5 is a cross-sectional view of the pixel display region, taken along the lines A–C in FIG. 9; and FIG. 6 is a cross-sectional view showing the same pixel display region, taken along the lines B–C in FIG. 9. The third embodiment will be described hereinbelow with reference to these drawings and FIG. 10 which shows the plane pattern of a stripe-shaped light shading film and the pixel display regions.

Further, the same reference numerals have been retained for similar parts or elements having the same functions as with the case of the first embodiment. Further, the same manufacturing process is omitted herein.

On the glass substrate 18 formed with an undercoat film 26, an amorphous silicon film (an amorphous semiconductor film) 19 and the insulating film 20 are formed continuously by the PE-CVD method in a vacuum. The film thickness of the amorphous silicon film 19 is 4000 angstrom; and that of the insulating film 20 (a silicon nitride film) is 4000 angstrom.

Further, after an amorphous silicon film 21 has been formed as an active layer by the PE-CVD method, hydrogen existing in the amorphous silicon film 19, the insulating film 20 and the active layer 21 is dehydrated by heat treatment at 500° C.

Further, the film thickness of the amorphous silicon film (the active layer) 21 is 500 angstrom.

Further, after the amorphous silicon film 19 has been poly-crystallized by the ELA method, the poly-crystalline silicon film is formed into the island-shaped pattern 21 as shown in FIG. 2 by use of the CDE method.

The other processing steps are the same way as with the case of the second embodiment, and thereby omitted herein.

In the structure of this third embodiment, it is possible to form the light shading film and the insulating film continuously.

Fourth embodiment

When the optical density value of the film for preventing light leakage is stated, the dependency of wavelength upon the optical density in the visible range is a matter to be considered. Here, it is preferable that the optical density $OD_1$ is averaged over all the wavelength range. However, there exists a tendency that the optical density $OD_1$ of the amorphous silicon film is small in the red wavelength range. Therefore, when the amorphous silicon film is used as the film for preventing the light leakage, there exists a possibility that the red light leaks so that the screen is seen somewhat in red. To overcome this problem, the method of forming a blue color filter 28 for passing only the light away from the red wavelength range as an auxiliary light shading film will be described hereinbelow. This blue color filter is formed at the same time when the color filter of the pixel display regions is formed into the shape of the array substrate.

Figure 10A:
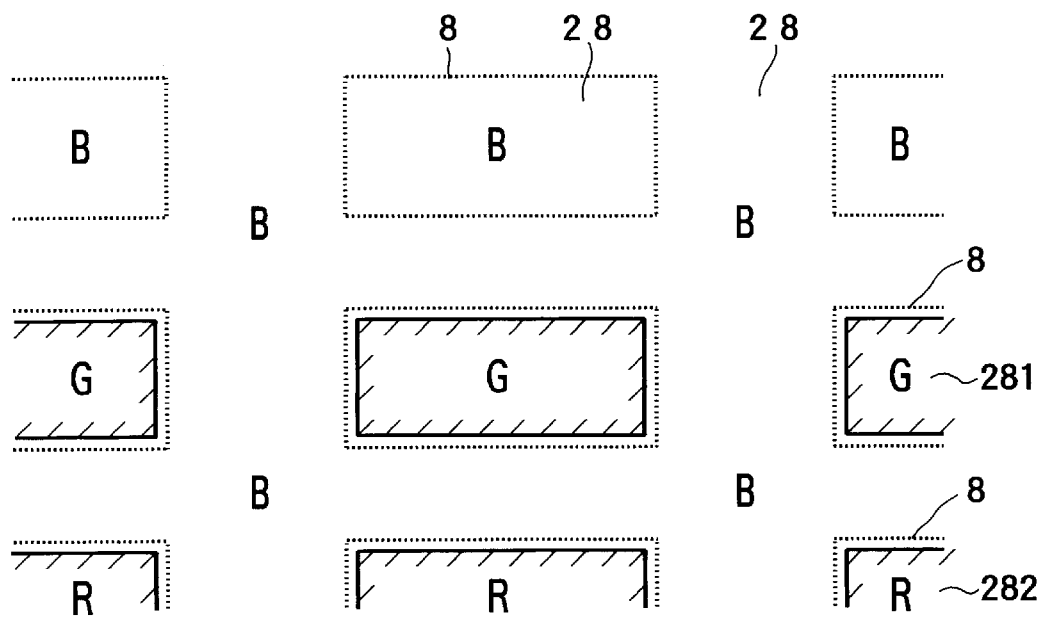
FIG. 10A is an illustration for assistance in explaining an example of a color filter arrangement in the device shown in FIG. 9.

FIG. 10A shows the color filter arranged on the array substrate as shown in FIG. 9 so as to correspond to this embodiment. Further, FIG. 7 is a cross-sectional view showing the color filter arranged in accordance with this embodiment, taken along the line A–C shown in FIG. 9; and FIG. 8 is a cross-sectional view showing the same, taken along the line B–C in FIG. 9.

As shown in FIG. 10A, a color filter layer (shown by solid lines) composed of an R (red) layer 282, a G (green) layer 281, and a B (blue) layer 28 is arranged in the column direction (the vertical direction in the drawing) of the array substrate and in correspondence to the transparent pixel electrodes (shown by dashed lines). Among these layers, the B layer 28 is arranged between each pair of adjacent transparent pixel electrodes 8. Further, an amorphous semiconductor layer 19 is formed under the B layer formed between each pair of adjacent transparent pixel electrodes 8.

Figure 7:
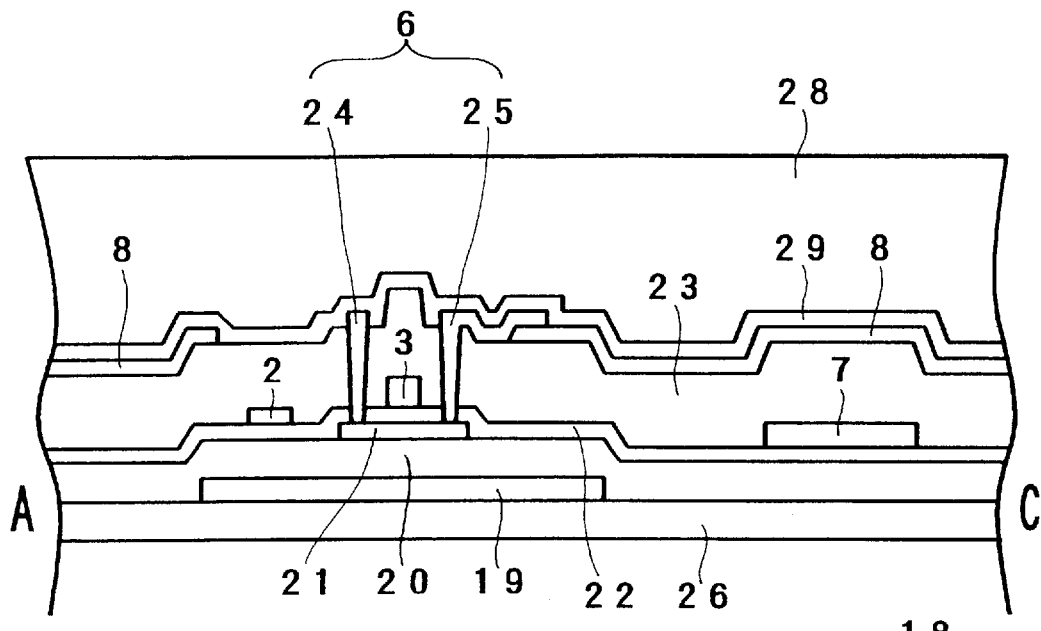
FIG. 7 is a cross-sectional view showing a pixel of a fourth embodiment of the liquid crystal display device, taken along the two lines A–C shown in FIG. 9.
Figure 8:
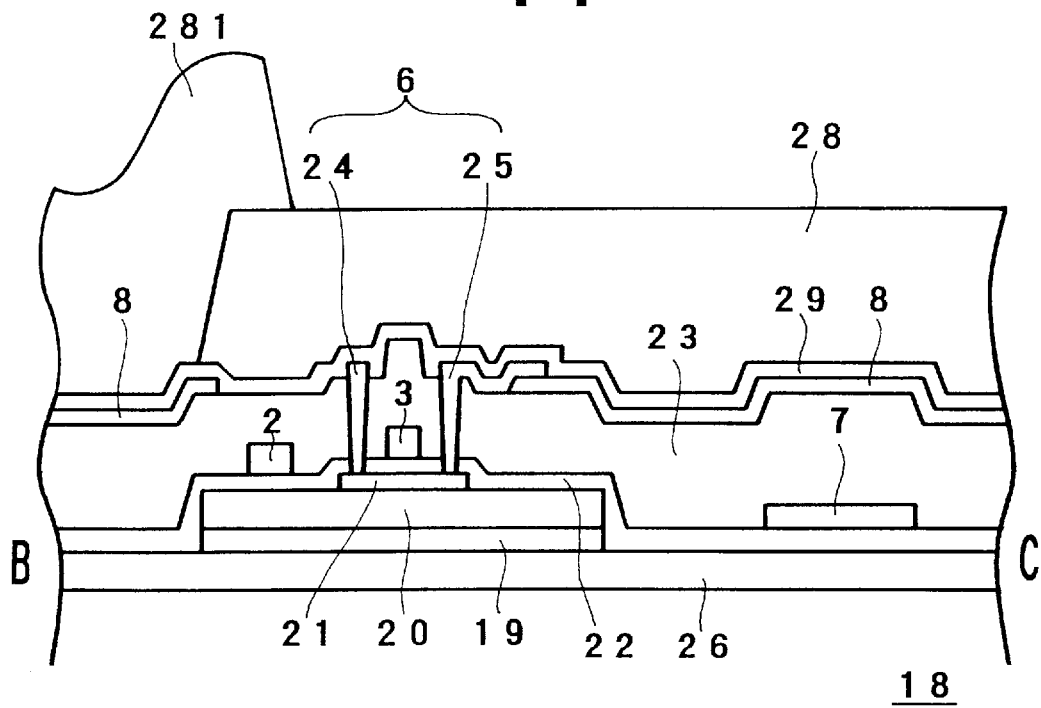
FIG. 8 is a cross-sectional view showing a pixel of the fourth embodiment of the liquid crystal display device, taken along the two lines B–C shown in FIG. 9.

In other words, as shown in FIGS. 7 and 8, since the amorphous semiconductor film 19 is arranged on the undercoat film 26 in correspondence to the region between the two adjacent transparent pixel electrodes 8, it is possible to shade the visible light in combination with the blue layer 28 formed thereover, with the result that the light leakage between the adjacent pixels can be prevented and thereby an excellent contrast can be obtained.

Fifth embodiment

In the above-mentioned first to fourth embodiments, since the signal lines and the pixel electrodes are arranged on the same layer, it is necessary to increase a space between both the lines to such an extent that the capacitive coupling between the two lines can be negligible. In the ordinary driving method, a space of about 5 $\mu$m is necessary between both the lines. Therefore, it is impossible to increase the aperture ratio in the areas corresponding to these spaces.

Figure 12:
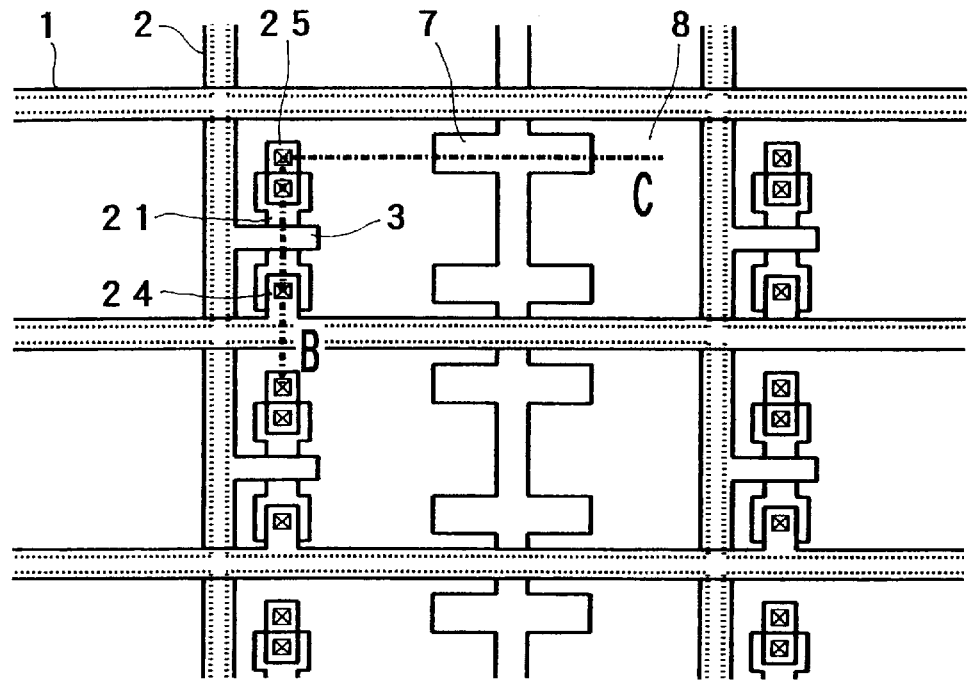
FIG. 12 is a plane view showing the pixels of the fifth embodiment of the liquid crystal display device.
Figure 13:
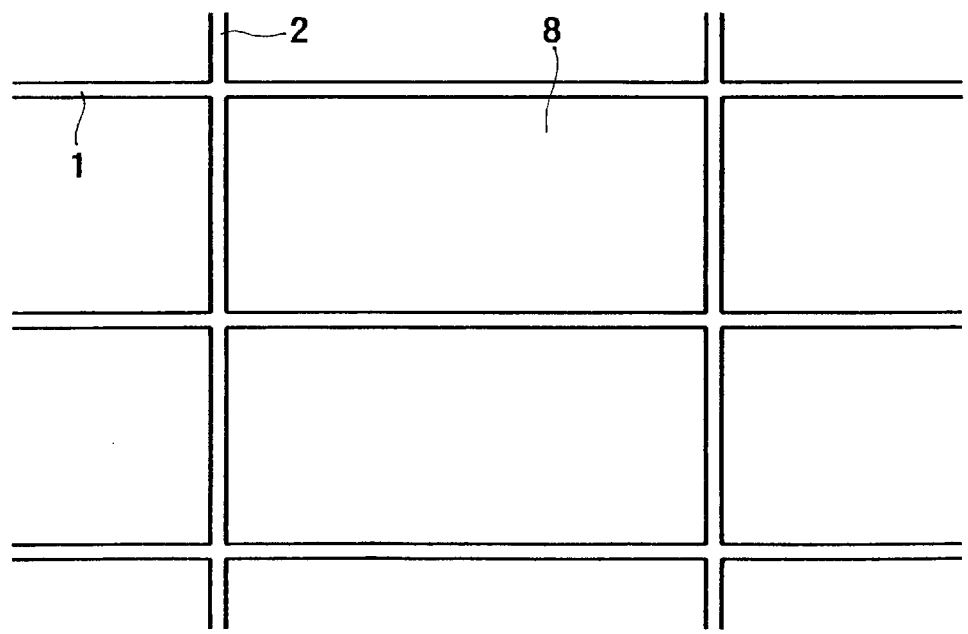
FIG. 13 is a plane view showing the pixel electrodes shown in FIG. 12.
Figure 14:
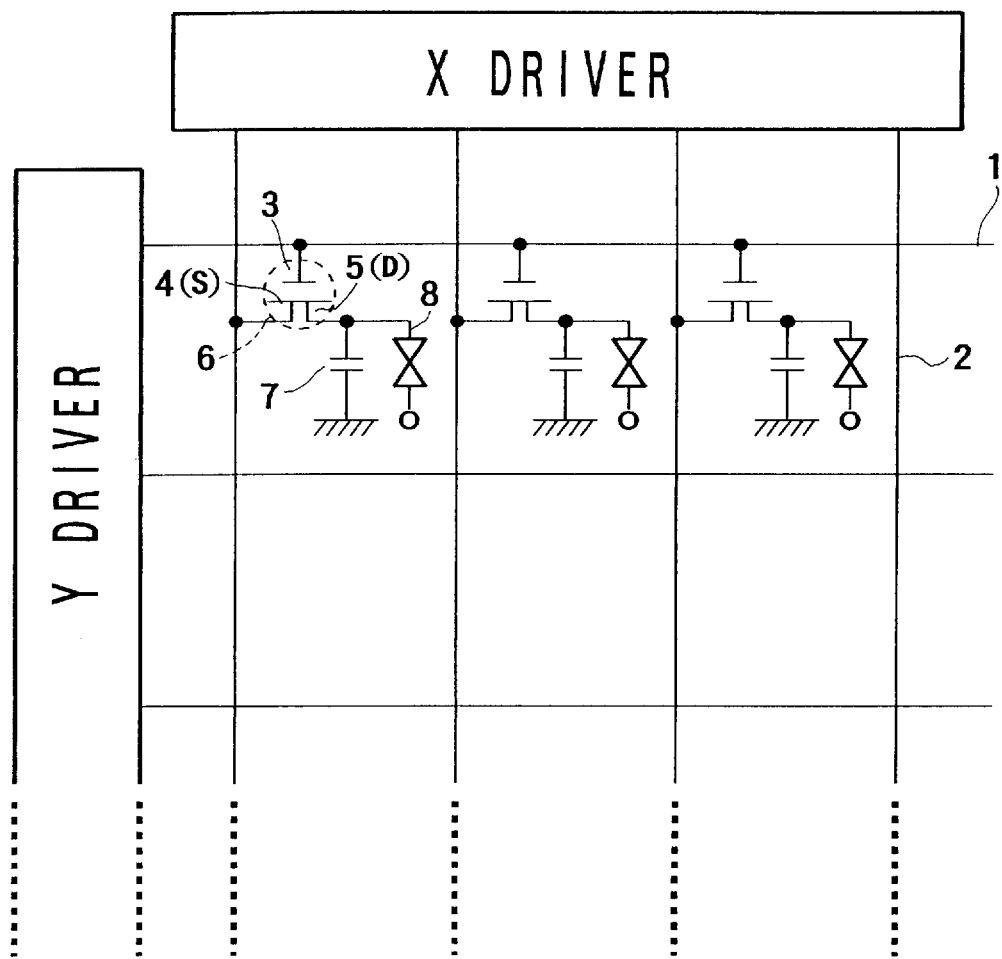
FIG. 14 is a simplified illustration showing the general liquid crystal display device.
Figure 15:
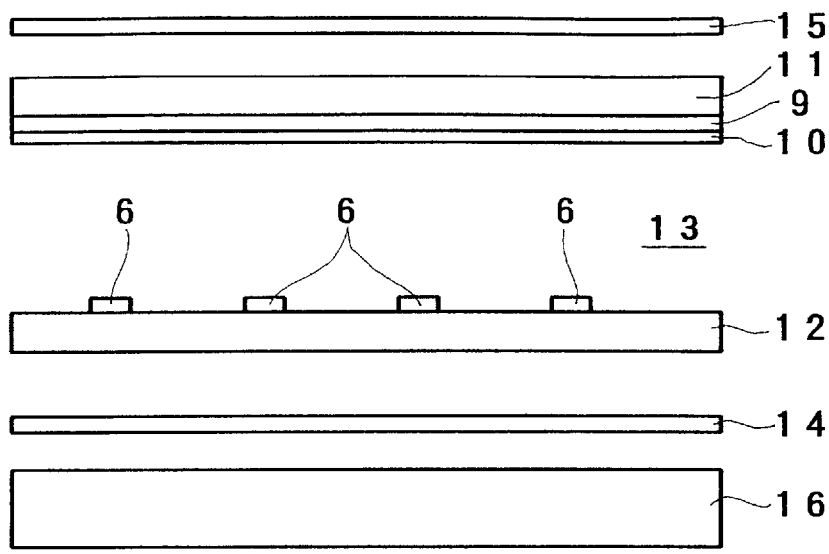
FIG. 15 is an arrangement view showing a cell, in which a back light is placed on the array substrate side.
Figure 16:
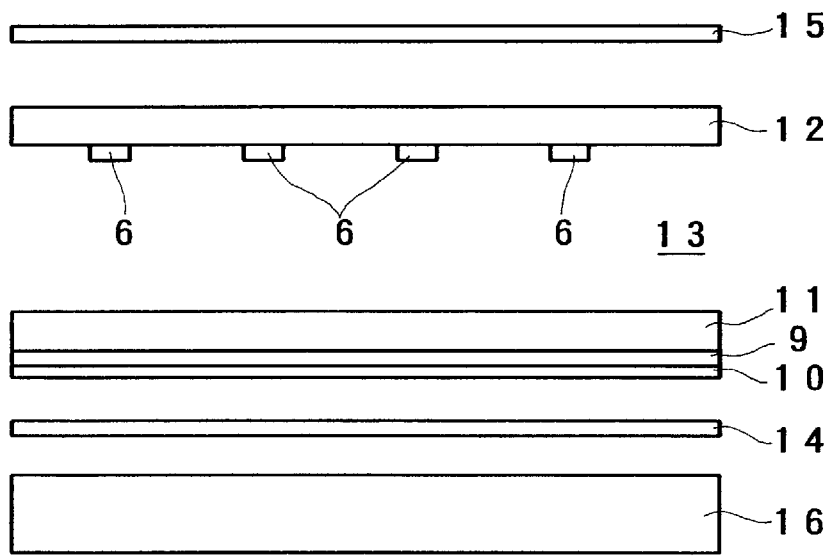
FIG. 16 is an arrangement view of a cell, in which the back light is placed on the opposed substrate side.

In the present invention, therefore, as shown in FIG. 12, the peripheral portions (shown by dot lines) of the transparent pixel electrodes 8 are overlapped with the signal lines 1 and the scanning lines 2 arranged in a matrix pattern via an interlayer insulating film. Owing to this structure, it is possible to electrically separate the transparent pixel electrodes 8 from signal lines 1 and the scanning lines 2 and further to eliminate plane gaps between the transparent pixel electrodes 8. Further, FIG. 13 shows only the signal and scanning lines 1 and 2 and the transparent pixel electrodes 8 formed under these lines all shown in FIG. 12, for brevity.

In the embodiment shown in FIG. 12, since the end portions of the adjacent transparent pixel electrodes 8 are overlapped with the signal and scanning lines, it is possible to allow these signal and scanning lines to serve as a light shading layer for partitioning the adjacent pixels. On the other hand, in order to prevent light from being incident upon the active layer of the poly-crystalline thin film transistors, in this embodiment, the same light shading film as with the case of the first embodiment is arranged.

Further, FIG. 11 shows a cross-sectional view, taken along the line B–C shown in FIG. 12. As shown in FIG. 11, the end portion of the long side of the transparent pixel electrode 8 is overlapped with the signal line 1 via the interlayer insulating film 30. Further, although not shown, the end portion of the short side of the transparent electrode 8 is overlapped with the scanning line 2 formed integral with the gate electrode 3, via the two interlayer insulating film 22 and 23. Further, the amorphous silicon layer 19 is formed under the active layer 21 to reduce the light allowed to be incident upon the active layer 21.

The fifth embodiment of the above-mentioned structure and formed with the light shading film for preventing light from being incident upon the active layer will be described hereinbelow with reference to FIG. 11, which is a cross-sectional view showing the pixel display region, taken along the lines B–C in FIG. 12.

On a glass substrate 18 formed with an undercoat film 26, an amorphous semiconductor film 19 as a light shading film, an insulating film 20, and an amorphous silicon film as an active layer 21 are formed continuously in a vacuum in accordance with the PE-CVD (plasma chemical vapor deposition) method.

After that, the substrate is heat-treated at 500° C. to dehydrate hydrogen existing in the amorphous semiconductor film 19, the insulating film 20 and the active layer 21. Here, the film thickness and the material of the amorphous semiconductor film (as the light shading film) 19 are the same as with the case of the first embodiment. The insulating film 20 is a silicon nitride film having a film thickness of 1000 angstrom. The film thickness of the amorphous silicon film (the active layer) 21 is 500 angstrom.

Further, the amorphous silicon film of the active layer 21 is poly-crystallized by the ELA (excimer laser anneal) method.

After that, the three layers of the poly-crystal silicon film 21, the silicon nitride film 20, and the amorphous semiconductor 19 are processed continuously by the CDE (chemical dry etching) method using a mixture gas of $CF_4$ and $O_2$, to obtain an island-shaped pattern as shown in FIG. 2.

Further, an oxide film used as a gate insulating film 22 having a thickness of 1000 angstrom is formed by the AP (atmospheric pressure and room temperature)-CVD method. After that, a gate electrode 3, an auxiliary capacitance electrode 7, and MoW (molybdenum tungsten alloy) lines 50 used as the scanning lines 2 are formed by spattering, and then processed by the CDE (chemical dry etching) method. Further, the film thickness of the MoW lines is 2500 angstrom.

Further, PH3 (donor) is implanted in accordance with ion doping method. The implantation conditions are that acceleration voltage is 70 KeV, and the dose is $1E16/cm^2$.

Further, an interlayer insulating film 23 is formed at a film forming temperature of 400° C. In this case, impurities are activated, so that the drain regions 4 and the source regions 5 (shown in FIG. 9) of the thin film transistors 9 can be formed. Further, the interlayer insulating film 23 is an oxide film having a film thickness of 5000 angstrom.

Then, after a contact hole $CH_1$ has been formed, the signal lines 1 of two layer structure of Mo (lower layer) and Al (upper layer), lines 25 for each connecting the active layer to the pixel electrode 8, and lines 24 each for connecting the thin film transistor to the line 24 are formed by spattering, and then processed by the wet method. Further, the film thickness of the Mo film is 1500 angstrom and the film thickness of the Al film is 4500 angstrom, respectively.

Further, after an array protective film 29 has been formed by the PE-CVD method, a contact hole (not shown) used to connect an external terminal is formed. Further, the protective film is a silicon nitride film, and the film thickness thereof is 2000 angstrom.

After that, an interlayer insulating film is formed by use of an application type photosensitive organic film 30. The film thickness thereof is 3.0 $\mu$m. Here, since the contact hole $CH_2$ is opened in the silicon nitride film 29 before the application-type photosensitive organic film 30 is applied, the contact hole can be formed after the application type photosensitive organic film 30 has been patterned.

Further, after an ITO film used as the pixel electrodes 8 has been formed by the spattering method, the substrate is processed by the wet method.

In the above-mentioned first to fifth embodiments, the respective films, that is, a single layer film of the active layer, a two layer film composed of the insulating film and the light shading film, and a three layer film composed of the active layer, the insulating film and the amorphous semiconductor film are all processed by use of the CDE method, as far as the shape for covering the gate insulating film can be obtained, it is possible to process the respective films by the method other than the CDE method, for instance such as the plasma etching method, reactive ion etching method, etc.

Further, gas other than the mixture of $CF_4$ and $O_2$ can be used as the etching gas.

In the embodiments of the present invention, since the light prevention film is formed on the array substrate to shade the light incident upon the active layer (polycrystal silicon) and the light leaking through the gaps other than the pixel display regions, it is possible to realize the liquid crystal display device of high display performance at a relatively low cost, while solving the problems related to the reflection, film thickness, the number of manufacturing steps, the aperture ratio, etc.

As described above, in the liquid crystal display device according to the present invention, since the amorphous silicon film is formed under the active layer of the poly-crystal silicon for forming the thin film transistors via the insulating film, it is possible to shade the light from being incident upon the active layer of polycrystal silicon. Further, since the amorphous silicon film and the insulating film are formed roughly all over the areas other than the pixel display regions, it is possible to prevent light from leaking through the gaps between the lines and the pixel electrodes. Further, since the light shading film formed of organic material is formed on the upper surface of the array substrate other than the pixel display regions, it is possible to further increase the performance of shading light through the gaps. As a result, it is possible to prevent the display performance of the liquid crystal display elements from being lowered at a relatively low cost, without reducing the aperture ratio.

What is claimed is:

1. A liquid crystal display device, comprising:
   a first electrode substrate having:
   a transparent insulating substrate scanning lines and signal lines arranged crossing each other on said transparent insulating substrate in a matrix pattern;
   a plurality of pixel electrodes formed at positions enclosed by said scanning lines and said signal lines, respectively and a plurality of poly-crystalline silicon thin film transistors formed on said transparent insulating substrate via a light shading film and an insulating film, said light shading film being an amorphous semiconductor film serving to prevent light from being incident upon an active layer of said transistors, a source electrode of each of said transistors being connected to said signal line and a drain electrode of each of said transistors being connected to said pixel electrode;

a second electrode substrate having an opposing electrode; and a liquid crystal encapsulated between said first and second electrode substrates, wherein said light shading film is formed over said transparent insulating substrate as a plurality of independent island shapes, said insulating film and the active layer being formed in sequence on said independent island shapes, said independent island shapes being electrically insulated from each other.

2. The liquid crystal display device of claim 1, wherein said light shading film is patterned into the same shape as that of said active layer in plane.

3. The liquid crystal display device of claim 1, wherein said scanning lines and said signal lines are formed so as to be overlapped with ends of said pixel electrodes via an interlayer insulating film.

4. The liquid crystal display device of claim 1, wherein an optical density value $OD_2$ of said light shading film is one or more in visible light range, the optical density value $OD_2$ being expressed as $$OD_2 = -\log_{10}\tilde{T}(\lambda)$$

$$\tilde{T}(\lambda) = \frac{\int_a^b T(\lambda)d\lambda}{b-a}$$

where $\lambda$ denotes light wavelength; $T(\lambda)$ denotes transmissivity of each wavelength; a and b denote both ends of visible rays as a=400 nm and b=700 nm.

5. The liquid crystal display device of claim 1, wherein said active layer is a poly-crystalline silicon film obtained by changing an amorphous silicon film thereto in accordance with excimer laser anneal method.

6. The liquid crystal display device of claim 1, which further comprises an auxiliary light shading film formed over said transistors.

7. A liquid crystal display device, comprising:

a first electrode substrate having:

a transparent insulating substrate;

scanning lines and signal lines arranged crossing each other on said transparent insulating substrate in a matrix pattern;

a plurality of pixel electrodes formed at positions enclosed by said scanning lines and said signal lines, respectively; and a plurality of poly-crystalline silicon thin film transistors formed on said transparent insulating substrate via a light shading film and an insulating film, said light shading film being an amorphous semiconductor film serving to prevent light from being incident upon an active layer of said transistors, a source electrode of each of said transistors being connected to said signal line and a drain electrode of each of said transistors being connected to said pixel electrode;

a second electrode substrate having an opposing electrode; and a liquid crystal encapsulated between said first and second electrode substrates, wherein an optical density value $OD_2$ of said light shading film is one or more in visible light range, the optical density value $OD_2$ being expressed as $$OD_2 = -\log_{10}\tilde{T}(\lambda),$$

$$\tilde{T}(\lambda) = \frac{\int_a^b T(\lambda)d\lambda}{b-a},$$

where $\lambda$ denotes light wavelength; $T(\lambda)$ denotes transmissivity of each wavelength; a and b denote both ends of visible rays as a=400 nm and b=700 nm.

8. A liquid crystal display device, comprising:

a first electrode substrate having:

a transparent insulating substrate;

scanning lines and signal lines arranged crossing each other on said transparent insulating substrate in a matrix pattern;

a plurality of pixel electrodes formed at positions enclosed by said scanning lines and said signal lines, respectively; and a plurality of poly-crystalline silicon thin film transistors formed on said transparent insulating substrate via a light shading film and an insulating film, said light shading film being an amorphous semiconductor film serving to prevent light from being incident upon an active layer of said transistors, a source electrode of each of said transistors being connected to said signal line and a drain electrode of each of said transistors being connected to said pixel electrode;

a second electrode substrate having an opposing electrode; and a liquid crystal encapsulated between said first and second electrode substrates, wherein a second light shading layer formed by the same layer as said light shading layer is formed in a region between a pair of adjacent ones said pixel electrodes.

9. The liquid crystal display device of claim 8, wherein a blue coloring layer is arranged over said second light shading layer formed in the region between a pair of said adjacent pixel electrodes, so as to cover said second light shading layer.

10. The liquid crystal display device of claim 8, wherein an optical density value $OD_3$ of said light shading film is two or more in visible light range, the optical density value $OD_3$ being expressed as $$OD_3 = -\log_{10}Y(\lambda),$$

$$Y(\lambda) = \frac{\int_a^b T(\lambda)V(\lambda)d\lambda}{b-a},$$

where $\lambda$ denotes light wavelength; $T(\lambda)$ denotes transmissivity of each wavelength; a and b denote both ends of visible rays as a=400 nm and b=700 nm; and $V(\lambda)$ denotes a standard relative visibility.

* * * * *